US010239414B2

(12) United States Patent
Araki

(10) Patent No.: US 10,239,414 B2
(45) Date of Patent: Mar. 26, 2019

(54) INFORMATION PROVIDING SYSTEM, POWER RECEIVING DEVICE, INFORMATION PROVIDING METHOD AND INFORMATION PROVIDING PROGRAM

(71) Applicant: IHI CORPORATION, Tokyo (JP)

(72) Inventor: Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 15 days.

(21) Appl. No.: 15/486,573

(22) Filed: Apr. 13, 2017

(65) Prior Publication Data

US 2017/0217319 A1 Aug. 3, 2017

Related U.S. Application Data

(63) Continuation of application No. PCT/JP2015/082265, filed on Nov. 17, 2015.

(30) Foreign Application Priority Data

Nov. 27, 2014 (JP) ................................ 2014-239844

(51) Int. Cl.
*H02J 7/00* (2006.01)
*B60L 11/18* (2006.01)
(Continued)

(52) U.S. Cl.
CPC ......... *B60L 11/182* (2013.01); *B60L 11/1838* (2013.01); *G01B 21/16* (2013.01);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

2003/0038637 A1* 2/2003 Bertness ............ G01R 31/3624 324/426
2012/0123670 A1 5/2012 Uyeki
(Continued)

FOREIGN PATENT DOCUMENTS

JP 2011-215703 A 10/2011
JP 2011-227541 A 11/2011
(Continued)

*Primary Examiner* — Arun C Williams
(74) *Attorney, Agent, or Firm* — Volpe and Koenig, P.C.

(57) ABSTRACT

According to an embodiment, an information providing system for providing information about a wireless power transfer system including a power receiver mounted on a moving object and one or more power transmitters installed in one or more charging stations includes a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver, and an output unit configured to output the location information of the charging station extracted by the search unit.

13 Claims, 14 Drawing Sheets

20
DATABASE
N
1
10
CHARGING STATION
93
V
92b
92a
92(90)
91a
91b
91(90)

(51) Int. Cl.

| | |
|---|---|
| ***G06Q 50/10*** | (2012.01) |
| ***H02J 50/12*** | (2016.01) |
| ***G01B 21/16*** | (2006.01) |
| ***G06Q 50/06*** | (2012.01) |
| ***H02J 7/02*** | (2016.01) |
| ***H02J 50/10*** | (2016.01) |
| ***H02J 50/80*** | (2016.01) |
| ***G01C 21/36*** | (2006.01) |
| *G06F 17/30* | (2006.01) |

(52) U.S. Cl.

CPC ..... *G01C 21/3617* (2013.01); *G01C 21/3679* (2013.01); *G06Q 50/06* (2013.01); *G06Q 50/10* (2013.01); *H02J 7/0027* (2013.01); *H02J 7/0047* (2013.01); *H02J 7/025* (2013.01); *H02J 50/10* (2016.02); *H02J 50/12* (2016.02); *H02J 50/80* (2016.02); *B60L 2240/62* (2013.01); *G06F 17/30241* (2013.01); *Y02T 10/7055* (2013.01); *Y04S 10/60* (2013.01)

(58) Field of Classification Search

USPC .......................................................... 320/108

See application file for complete search history.

(56) References Cited

U.S. PATENT DOCUMENTS

| | | | |
|---|---|---|---|
| 2012/0306446 A1 | 12/2012 | Suganuma et al. | |
| 2014/0021908 A1* | 1/2014 | McCool ................ | B60L 11/182 320/108 |
| 2015/0294329 A1* | 10/2015 | Saito .................. | G06Q 30/0202 705/7.31 |

FOREIGN PATENT DOCUMENTS

| | | |
|---|---|---|
| JP | 2013-104680 A | 5/2013 |
| JP | 2013-167640 A | 8/2013 |
| JP | 2013-170932 A | 9/2013 |
| JP | 2013-185854 A | 9/2013 |
| JP | 2013-210281 A | 10/2013 |
| JP | 2013-543979 A | 12/2013 |

* cited by examiner

1
N
10
V
92(90)
92b
92a
93
20
DATABASE
91b
91(90)
91a
CHARGING STATION

| NAME | LOCATION | POWER TRANSMITTER ID | NUMBER OF POWER TRANSMITTERS | DEGREE OF CONGESTION | UNIT PRICE | CAMPAIGN |
|---|---|---|---|---|---|---|
| | | 111 | 2 | 0/2 | | |
| | | 112 | 1 | 1/1 | | |
| | | 113 | 1 | 0/1 | | |
| STATION A | MINATO-KU, TOKYO ... | 114 | 2 | 2/2 | ... | ... |
| STATION B | YOKOHAMA, KANAGAWA .. | 111 | 4 | 2/4 | ... | ... |
| | | 112 | 3 | 3/3 | | |
| STATION C | YOKOHAMA, KANAGAWA .. | 117 | 2 | 0/2 | ... | ... |
| | | 111 | 1 | 1/1 | | |
| | | 114 | 1 | 0/1 | | |
| | | 115 | 1 | 0/1 | | |
| STATION D | KAWASAKI, KANAGAWA ... | 116 | 1 | 1/1 | ... | ... |
| | | 111 | 2 | 2/2 | | |
| STATION E | SHINAGAWA-KU, TOKYO ... | 116 | 3 | 1/3 | ... | ... |
| ... | ... | ... | ... | ... | ... | ... |

| POWER RECEIVER ID | POWER TRANSMITTER ID |
| --- | --- |
| 201 | 111,112,113,114,115,116 |
| 202 | 111,115,116 |
| 203 | 111,112,113,114 |
| 204 | 111,112,113,114,115,116,117 |
| 205 | 113,114,115,116,117 |
| ... | ... |

| POWER TRANSMITTER ID | POWER EFFICIENCY (%) | AVERAGE AMOUNT OF CHARGE (kW•s) | ERROR PROBABILITY (%) | ALLOWABLE AMOUNT OF POSITIONAL SHIFT (mm) |
|---|---|---|---|---|
| 111 | 91 | 3.3 | 5 | 150 |
| 112 | 89 | 3.5 | 6 | 120 |
| 114 | 93 | 3.1 | 3 | 80 |
| 116 | 91 | 3.1 | 2 | 90 |
| ... | ... | ... | ... | ... |

| POWER TRANSMITTER ID | POWER RECEIVER ID | POWER RECEIVER S/N | POWER EFFICIENCY (%) | AVERAGE AMOUNT OF CHARGE (kW•s) | ERROR PROBABILITY (%) | ALLOWABLE AMOUNT OF POSITIONAL SHIFT (mm) |
|---|---|---|---|---|---|---|
| 111 | 201 | 000001 | 91 | 3.3 | 5 | 110 |
| | | 000002 | 90 | 3.0 | 8 | 100 |
| | | ... | ... | ... | ... | ... |
| | 202 | 000103 | 88 | 3.1 | 7 | 90 |
| | | 000104 | 92 | 3.1 | 6 | 110 |
| | | ... | ... | ... | ... | ... |
| | ... | ... | ... | ... | ... | ... |
| 112 | 201 | 000002 | 92 | 3.5 | 3 | 80 |
| | | 000004 | 91 | 3.2 | 5 | 100 |
| | | ... | ... | ... | ... | ... |
| | 203 | 000111 | 90 | 3.2 | 4 | 90 |
| | | 000113 | 87 | 3.4 | 5 | 130 |
| | | ... | ... | ... | ... | ... |
| | ... | ... | ... | ... | ... | ... |
| ... | ... | ... | ... | ... | ... | ... |

INFORMATION PROVIDING SYSTEM, POWER RECEIVING DEVICE, INFORMATION PROVIDING METHOD AND INFORMATION PROVIDING PROGRAM

TECHNICAL FIELD

The present disclosure relates to an information providing system, a power receiver, an information providing method, and an information providing program. The present application claims benefits of priority to Japanese Patent Application No. 2014-239844 filed on Nov. 27, 2014, which is hereby incorporated by reference in its entirety.

BACKGROUND ART

Conventionally, a moving object (for example, an electric vehicle) including a rechargeable battery as at least a part of a power source is known. Such a moving object needs to receive power fed by a charging station when the remaining amount of charge of the battery becomes small. In relation to this, a mechanism for guiding a user of the moving object to the charging station is known.

For example, a system for identifying a location of a charging station is disclosed in the following Patent Document 1. The system includes a location determination system that determines the location of the charging station on the basis of a position of a vehicle when a connector is connected to the charging station and a transmission device that transmits the location of the charging station to a remote charging station database.

In addition, a charging stand display system for detecting and displaying a charging stand that an electric transportation device is able to reach is disclosed in the following Patent Document 2. In the system, a management server acquires a position of the electric transportation device and the remaining amount of a battery thereof, acquires traveling history data corresponding to the position from a data management unit, generates display information on the basis of the traveling history data, the remaining amount of the battery, and charging stand location information for managing locations of a plurality of charging stands, and transmits the display information to a display terminal.

CITATION LIST

Patent Document

[Patent Document 1] JP 2013-543979 A
[Patent Document 2] JP 2013-104680 A

SUMMARY

Technical Problem

However, in a wireless power transfer system, power feeding performance may vary due to various factors such as configurations or installation modes of a power transmitter and a power receiver. For example, the power feeding performance may change according to a distance between coils of the power transmitter and the power receiver or a combination of constants of circuit elements constituting the power transmitter and the power receiver. Therefore, it is preferable to present a charging station having a power transmitter which is compatible with a power receiver mounted on a moving object instead of merely presenting a charging station, for a user of the moving object. On the other hand, some users may want to choose a charging station according to an element other than power feeding performance. In view of these points, it would be convenient if it is possible to present a charging station that meets a requirement of the user of the moving object using the wireless power transfer system.

Solution to Problem

An information providing system according to an aspect of the present disclosure is an information providing system for providing information about a wireless power transfer system including a power receiver mounted on a moving object and one or more power transmitters installed in one or more charging stations, the information providing system including: a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit.

Advantageous Effects

According to the aspect of the present disclosure, it is possible to present a charging station that meets a requirement of a user of a moving object using a wireless power transfer system.

BRIEF DESCRIPTION OF DRAWINGS

FIG. 4 is a diagram illustrating an example of a station table.

FIG. 5 is a diagram illustrating an example of a device table.

FIG. 6 is a diagram illustrating an example of a history storage unit.

FIG. 11 is a diagram illustrating an example of a history table.

DESCRIPTION OF EMBODIMENTS

Figure 1:
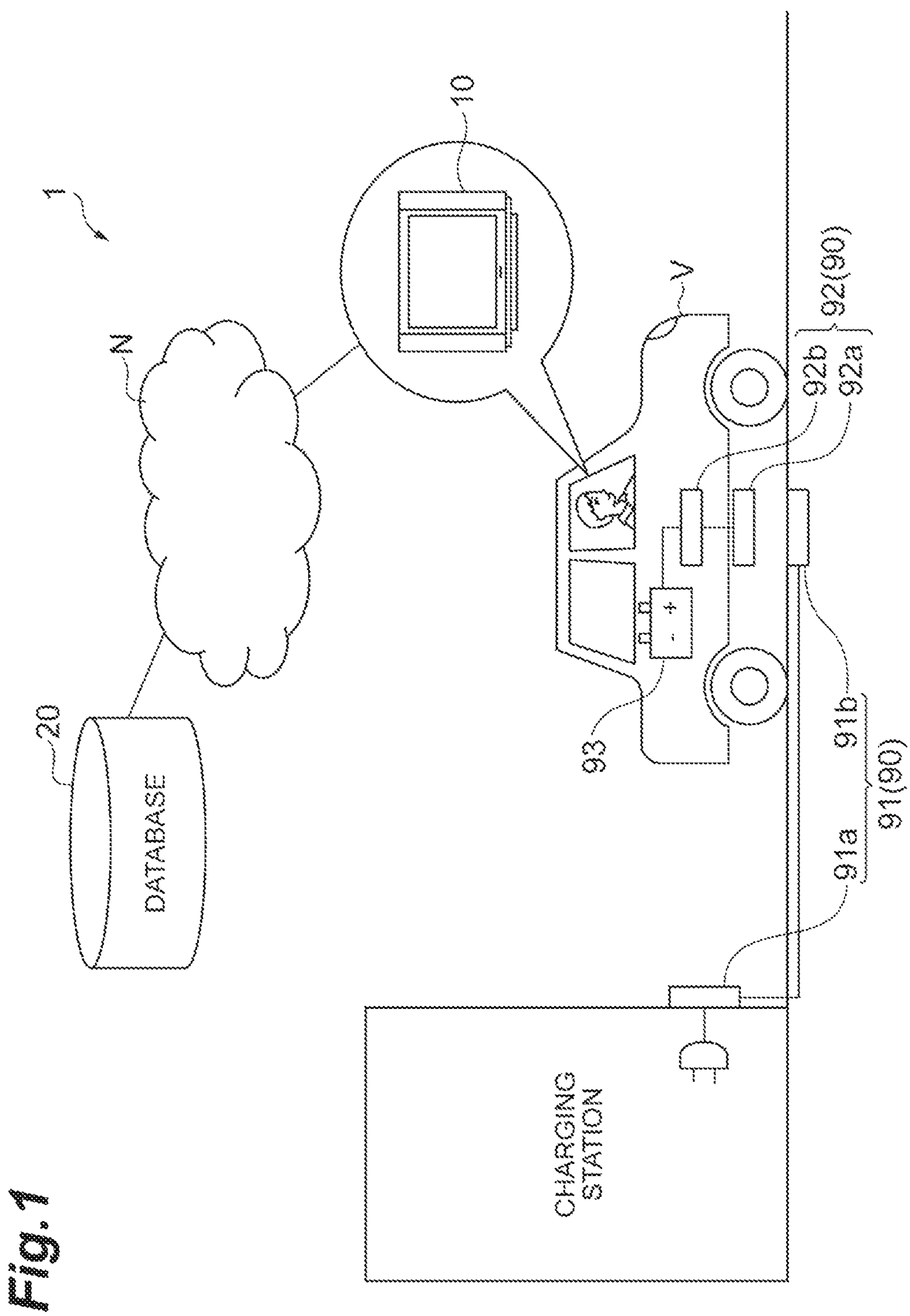
FIG. 1 is a diagram schematically illustrating a case in which an information providing system according to an embodiment is applied.

An information providing system according to an aspect of the present disclosure is an information providing system for providing information about a wireless power transfer system including a power receiver mounted on a moving object and one or more power transmitters installed in one or more charging stations, the information providing system including: a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit.

An information providing method according to an aspect of the present disclosure is an information providing method to be executed by a computer system for providing information about a wireless power transfer system including a power receiver mounted on a moving object and one or more power transmitters installed in one or more charging stations, the information providing method including: a search step of extracting location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output step of outputting the location information of the charging station extracted in the search step.

An information providing program according to an aspect of the present disclosure is an information providing program for causing a computer to function as an information providing system for providing information about a wireless power transfer system including a power receiver mounted on a moving object and one or more power transmitters installed in one or more charging stations, the computer functioning as: a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit.

In this aspect, location information of a charging station having a power transmitter previously used by the power receiver, i.e., a power transmitter previously selected by a user, is extracted. Therefore, it is possible to present a charging station that meets a requirement of the user of the moving object using a wireless power transfer system.

In the information providing system according to another aspect, the station information may further indicate a price or a service related to power feeding of each charging station, and the search unit may extract location information of a charging station in which a power transmitter capable of feeding power to the power receiver is installed and at least one of a price and a service of which satisfies a reference value. In general, the price of receiving a service of power feeding or the service is a concern for the user of the moving object. Therefore, convenience of the information providing system can be expected to be improved by providing the user with the location information of the charging station the price or the service of which satisfies the reference value.

In the information providing system according to another aspect, the usage history may further indicate an actual value of power feeding performance of each power transmitter, and the search unit may extract location information of a charging station having a power transmitter in which an actual value of the power feeding performance satisfies a reference value. As described above, the power feeding performance of the wireless power transfer system can vary due to various factors. Therefore, convenience of the information providing system can be expected to be improved by providing the location information of the charging station having the power transmitter satisfying a fixed standard of power feeding performance.

In the information providing system according to another aspect, the output unit may display the extracted location information of the charging station on a map. By displaying the location information on the map, it is possible to notice the user of a location of the charging station in an easy-to-understand manner.

In the information providing system according to another aspect, the output unit may display only location information of a charging station that the moving object is able to reach among the extracted location information of charging stations. By displaying only charging stations that the moving object is able to reach, it is possible to more reliably avoid running out of battery power of the moving object.

In the information providing system according to another aspect, when the number of charging stations that the moving object is able to reach is less than or equal to a threshold value, the output unit may display a route to a nearest charging station from a current position of the moving object. When the number of reachable charging stations is reduced, it is possible to more reliably avoid running out of battery power of the moving object by guiding the route to the nearest charging station.

A power receiver according to an aspect of the present disclosure is a power receiver which is mounted on a moving object and is able to receive power fed from a power transmitter in a wireless power transfer system including one or more power transmitters installed in one or more charging stations, the power receiver including: an ID storage unit configured to store a power receiver ID for identifying the power receiver; and an ID providing unit configured to output the power receiver ID to an information providing system that provides information about the wireless power transfer system, wherein the information providing system extracts location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver, by using the power receiver ID output from the ID providing unit, and wherein the information providing system outputs the extracted location information of the charging station.

In this aspect, because the location information of a charging station having the power transmitter previously used by the power receiver, i.e., the power transmitter previously selected by a user, is extracted, it is possible to present the charging station that meets a requirement of a user. Also, a power transmitter predicted to have good compatibility with the power receiver can be expected to be reliably identified by using the power receiver ID.

Hereinafter, embodiments of the present disclosure will be described in detail with reference to the accompanying drawings. Also, the same or corresponding parts are denoted by the same reference signs in the drawings, without redundant description.

First Embodiment

Functions and configurations of an information providing system 1 according to the first embodiment will be described with reference to FIGS. 1 to 8. The information providing system 1 is a computer system that guides a user of a moving object having a rechargeable battery (hereinafter simply referred to as a "battery") as at least a part of a power source to a location of a charging station.

A "moving object" in this specification is a device that transports people or objects from a certain place to another place. In the present embodiment, an electric vehicle is shown as an example of the moving object, but the type of moving object is not limited thereto. For example, the moving object may be a motorcycle, a bicycle, a train, a water vessel, an underwater vehicle, or an airplane. Therefore, a route along which the moving object travels may be a land route, a water route, or an air route.

A "user of the moving object" (hereinafter also simply referred to as a "user") in the present specification is a person who intends to know a location of a charging station. The user may be a driver or an operator of the moving object, a passenger of the moving object, or a person who is not on the moving object.

A "charging station" in the present specification is a place where a battery of the moving object can be charged. Because the type of moving object is not limited, a location where the charging station is provided is also not limited. For example, the charging station may be located along a road or in a port, an airport, or the like.

FIG. 1 schematically illustrates a configuration of the information providing system 1. As illustrated in FIG. 1, the information providing system 1 includes a terminal 10 that displays a location of a charging station to a user, and a database 20 that stores information necessary for displaying. Although only one terminal 10 is illustrated in FIG. 1, the information providing system 1 may include a plurality of terminals 10. The terminal 10 and the database 20 can exchange data with each other via a communication network N. Also, a configuration of the communication network N is not limited, and the communication network N may be constructed by any communication network such as the Internet or an intranet.

FIG. 1 also schematically illustrates a configuration of a wireless power transfer system 90. The wireless power transfer system 90 includes a power transmitter 91 and a power receiver 92, and is a system for wirelessly supplying power from the power transmitter 91 to the power receiver 92 using magnetic coupling between coils, such as a magnetic field resonance method or an electromagnetic induction method. The power transmitter 91 includes a transmission power converting device (for example, a rectification circuit, a DC/DC, converter, an inverter circuit, etc.) 91*a* and a power transmission coil device 91*b*, and is installed in the charging station. The power receiver 92 includes a power receiving coil device 92*a* and a received power converting device (for example, a rectification circuit, a DC/DC converter, or the like) 92*b*, and is mounted on a moving object V. Power sent to the power receiver 92 is accumulated in a battery 93 of the moving object V.

The type of computer used as the terminal 10 is not limited, and the terminal 10 may or may not be mounted on the moving object V. For example, the terminal 10 may be a car navigation system or a portable terminal such as a high-function portable phone (a smartphone), a portable phone, a personal digital assistance (a PDA), a tablet, a laptop personal computer, or the like. When the terminal 10 is not mounted on the moving object V, the terminal 10 may or may not be connectable to the system in the moving object V.

Figure 2:
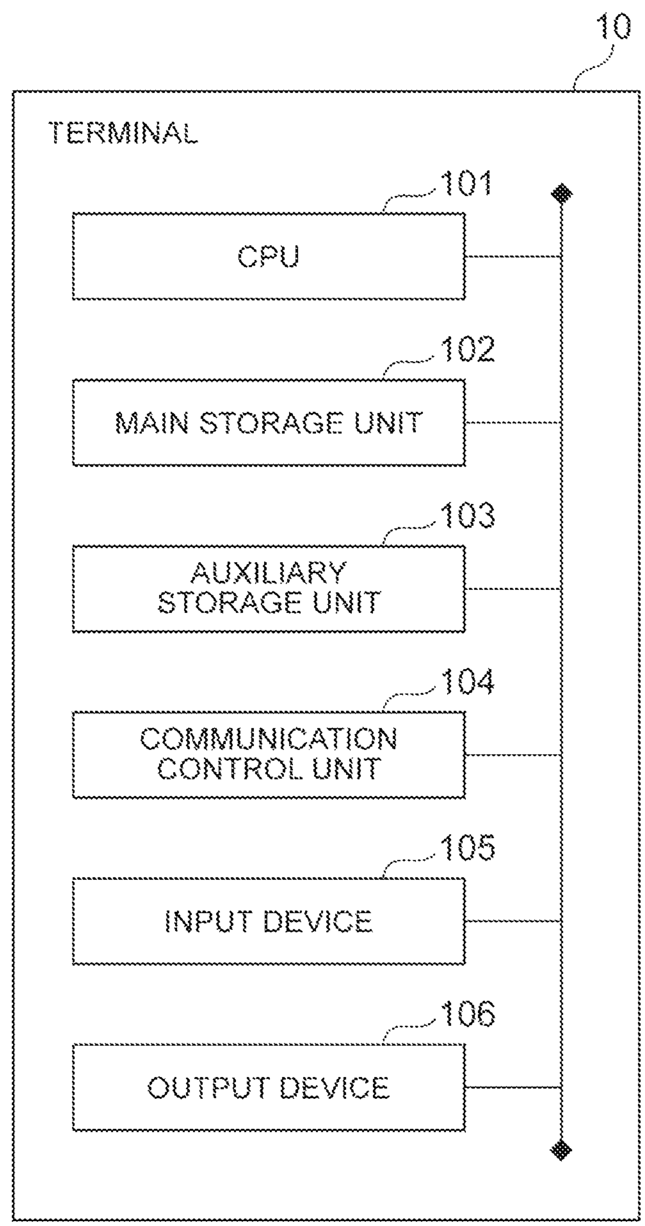
FIG. 2 is a diagram illustrating a hardware configuration of a terminal to be used in the information providing system according to an embodiment.

A general hardware configuration of the terminal 10 is illustrated in FIG. 2. The terminal 10 includes a CPU (a processor) 101 that executes an operating system, an application program, and the like, a main storage unit 102 constituted of a ROM and a RAM, an auxiliary storage unit 103 constituted of a hard disk, a flash memory, and the like, a communication control unit 104 constituted of a network card or a wireless communication module, an input device 105 such as a keyboard, a mouse, or a touch panel, and an output device 106 such as a display or a touch panel. Needless to say, an installed hardware module differs according to a type of the terminal 10. For example, a PC normally has a keyboard, a mouse, and a monitor as an input device and an output device. On the other hand, in the car navigation system and the smartphone, a touch panel normally functions as the input device and the output device.

Each functional element of the terminal 10 to be described below is implemented by loading predetermined software on the CPU 101 or the main storage unit 102, operating the communication control unit 104, the input device 105, the output device 106, etc. under the control of the CPU 101, and reading and writing data in the main storage unit 102 or the auxiliary storage unit 103. Data or a database necessary for processing is stored in the main storage unit 102 or the auxiliary storage unit 103.

The database 20 stores a station table 21 and a device table 22.

The station table 21 is a set of pieces of station information indicating power transmitters installed in charging stations. A method of mounting the station table 21 is not limited, and, for example, the station table 21 may be a relational database or a CSV file. The station information may be newly registered, updated, or deleted by an administrator of the information providing system 1 when a charging station is newly registered, renovated, or closed and a power transmitter in the charging station is newly installed, changed, or removed.

FIG. 4 illustrates an example of the station information. Each record of the station information includes a name and a location of a charging station, IDs of one or more types of power transmitter installed in the charging station, the number of power transmitters, a degree of congestion for each power transmitter ID (a numerical value indicating how many power transmitters are available), a unit price of power feeding at the charging station, and a campaign which is currently performed at the charging station.

A method of expressing a location of a charging station is not limited as long as the notification of the location of the charging station can be provided to the user. For example, the location of the charging station may be represented by an address, a latitude/longitude, or both of the address and the latitude/longitude. In the example of FIG. 4, the location is represented by the address.

The power transmitter ID is an identifier for identifying the type of power transmitter, not for identifying each power transmitter. Therefore, the concept of the power transmitter ID is closer to a model number than a serial number. For example, the same power transmitter ID may be assigned to a plurality of power transmitters having the same specifications, the same power transmitter ID may be assigned to power transmitters of a plurality of types that are not completely identical in specification but belong to the same product group. Therefore, regardless of detailed specification differences, the same power transmitter ID may be assigned to power transmitters of a plurality of types of one manufacturer. In this manner, a method of assigning an ID to a power transmitter may be arbitrarily determined. Alternatively, in consideration of individual differences among a plurality of devices with the same model number, the power transmitter ID may be an identifier that identifies each power transmitter (for example, a serial number).

The degree of congestion is a numerical value indicating the number or proportion of currently available power transmitters. The degree of congestion can be set, for example, when the power transmitter 91 transmits a signal indicating a start and end of power feeding to some server (not illustrated) and the server updates a record of corresponding station information on the basis of the signal. Of course, a method of setting a degree of congestion is not limited thereto, and any method may be used.

The unit price is a type of price related to power feeding at a charging station. The "price related to power feeding" in the present specification is a value indicating a monetary value to be paid to a charging station when the moving object receives power fed by the charging station. The price related to power feeding may be indicated by a unit price, or may be indicated by another index.

The campaign is a type of service related to power feeding at charging station. The "service related to power feeding" in this specification is a privilege provided to a user when the moving object receives power fed by a charging station. In the embodiment, the campaign is exemplified as the service, but a method of expressing the service is not limited thereto. Also, details of the campaign are not limited. For example, the details of the campaign may be information about a discount (such as a "discount of 3% for cash members"), information about point assignment (such as "doubling number of assigned points"), or information on provision of a gift (such as a "present of a towel"). Further, details of the campaign may be a privilege that the user can obtain by continuously using the same power transmitter or a power transmitter of the same manufacturer.

From FIG. 4, it can be seen that, for example, two power transmitters with an ID "111" and two power transmitters with an ID "114" are installed in a charging station A, and one power transmitter with an ID "112" and one power transmitter with an ID "113" are installed therein. Also, it can be seen that four power transmitters of only one type (the power transmitter ID "111") are installed in a charging station B. Also, it can be seen that a power transmitter with the power transmitter ID "112" is not available, but two power transmitters with power transmitter ID "117" are available in a charging station C.

The device table 22 is a set of pieces of device correspondence information indicating a combination for which power feeding is possible between a power receiver and a power transmitter. A method of mounting the device table 22 is not limited, and the device table 22 may be, for example, a relational database or a CSV file. The device correspondence information is newly registered, updated, or deleted by the administrator of the information providing system 1, for example, when a new power receiver or transmitter appears on the market or disappears from the market. A combination for which power feeding is possible between a power receiver and a power transmitter is determined by, for example, nominal compatibility as can be described in specifications or use manuals, compatibility based on actual use records, and the like. Also, if there is compatibility between all the power receivers and the power transmitters distributed on the market, power can be fed by any combination of the power receivers and the power transmitters. In this case, the device table 22 can therefore be omitted.

FIG. 5 illustrates an example of device correspondence information. Each record of the device correspondence information includes an ID of a power receiver and IDs of power transmitters of one or more types capable of feeding power to the power receiver. Similar to the power transmitter ID, the power receiver ID is an identifier for identifying a type of power receiver, not for identifying each power receiver. Therefore, the concept of the power receiver ID is also close to a model number. A type of power receiver to which a single power receiver ID is allocated can be considered as in the case of the power transmitter ID.

From FIG. 5, it can be seen that, for example, a power transmitter with an ID "111," "112," "113," "114," "115," or "116" corresponds to a power receiver with an ID "201." Also, it can be seen that a power transmitter with the ID "111," "115," or "116" corresponds to a power receiver with an ID "202."

Also, configurations of the station table 21 and the device table 22 are not limited to the examples of FIGS. 4 and 5. For example, another item may be added to the station information or the device correspondence information or some of the items illustrated in FIG. 4 or 5 may be omitted as necessary. Also, any normalization or redundancy may be performed on these databases. For example, it is possible to omit the device table 22 by including an item of power receiver ID corresponding to each power transmitter ID into the station information. Alternatively, the station information may include an item indicating whether the power transmitter is installed indoor or outdoor. Also, the record of the device table 22 may include one power transmitter ID and power receiver IDs of one or more types corresponding to the power transmitter ID.

Figure 3:
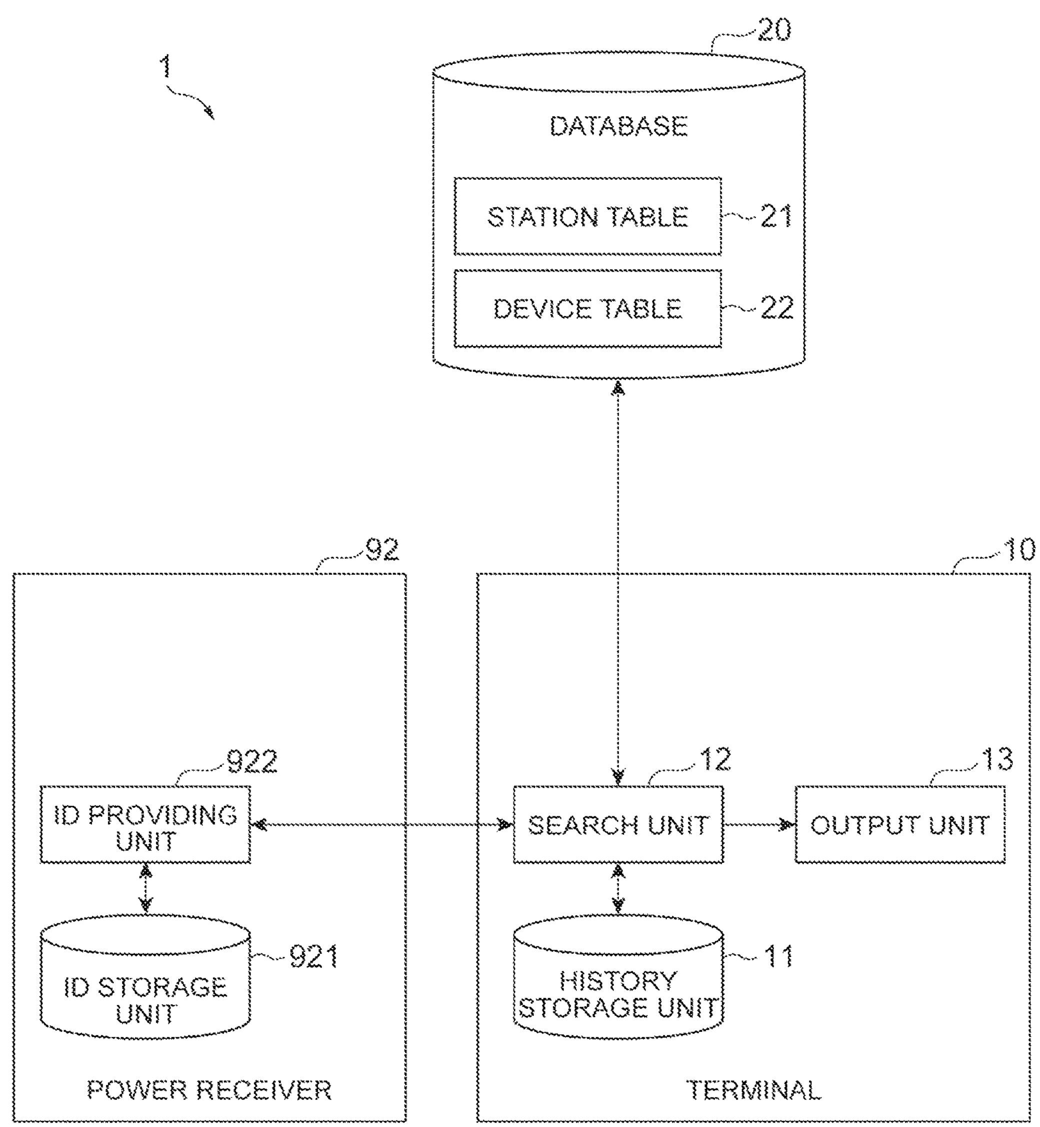
FIG. 3 is a block diagram illustrating a functional configuration of an information providing system according to a first embodiment.

In the present embodiment, the terminal 10 obtains necessary information from the power receiver 92 by communicating with the power receiver 92. Before detailed description of the terminal 10, a functional configuration of the power receiver 92 will be described. As illustrated in FIG. 3, the power receiver 92 includes an ID storage unit 921 and an ID providing unit 922 as functional components.

The ID storage unit 921 is a functional element that stores an ID of the power receiver 92 and is implemented by a memory. As described above, the power receiver ID is an identifier for identifying a type of power receiver, not for identifying each power receiver.

The ID providing unit 922 is a functional element that provides the power receiver ID to the terminal 10 and is implemented when the processor executes a predetermined program installed in the power receiver 92. When a request signal is received from the terminal 10, the ID providing unit 922 reads the power receiver ID from the ID storage unit 921 and transmits the received power receiver ID to the terminal 10. Also, a communication method between the terminal 10 and the power receiver 92 is not limited. For example, communication between the terminal 10 and the power receiver 92 may conform to an in-vehicle network standard such as a controller area network (CAN) or another communication protocol (for example, a protocol similar to that of the communication network N). Also, when a communication connection with the terminal 10 has been established, the power receiver 92 (the ID providing unit 922) may provide the power receiver ID to the terminal 10 even when there is no request from the terminal 10.

Next, a functional configuration of the terminal 10 will be described. As illustrated in FIG. 3, the terminal 10 includes a history storage unit 11, a search unit 12, and an output unit 13 as functional components.

The history storage unit 11 is a functional element that stores a usage history indicating the power transmitter 91 previously used by the power receiver 92 (in other words, the power transmitter 91 previously selected by the user or the moving object V). The power transmitter 91 previously used by the power receiver 92 refers to the power transmitter 91 that previously performed a wireless power transfer to the power receiver 92. The history storage unit 11 is implemented by a storage medium such as a memory. In the embodiment, it is assumed that the history storage unit 11 is provided in the terminal 10, but the history storage unit 11 may be provided outside the terminal 10. If the history storage unit 11 is prepared outside the terminal 10, the terminal 10 may access the history storage unit 11 via a communication network or may read the history storage unit 11 stored in a storage medium such as a USB memory or a DVD-ROM. A method of mounting the history storage unit 11 is not limited, and the history storage unit 11 may be, for example, a relational database or a CSV file.

The usage history is newly registered or updated by the terminal 10 when power feeding in the wireless power transfer system 90 is completed. For example, the terminal 10 acquires the power transmitter ID and a result related to power feeding performance from the wireless power transfer system 90 (more specifically, the power transmitter 91 or the power receiver 92), and newly registers or updates the usage history based on that information. When the terminal 10 first registers a usage history regarding a certain power transmitter ID, the terminal 10 may inquire the user regarding whether or not to register the power transmitter ID as a usage history, and may newly register the usage history on the power transmitter ID only when the user selects "register." By making an inquiry to the user in this manner, the user can receive guidance only on a charging station where there is a desired power transmitter.

FIG. 6 illustrates an example of a usage history. Each record of the usage history includes an ID of a power transmitter used for power feeding and an actual value of power feeding performance of the power transmitter. The "power feeding performance of the power transmitter" in the present specification is an index indicating a property or capability of the power transmitter obtained from a physical quantity related to power feeding performed in the wireless power transfer system. Also, the "actual value of power feeding performance" indicates a numerical value obtained as a result of power feeding that is actually performed. In the present embodiment, a past average value and error probability (%) for each of power efficiency (%), an average amount of charge (kW·s), and an allowable amount of positional shift (mm) are shown as power feeding performance. However, a value indicating the power feeding performance is not limited thereto and other indices may be used.

Power efficiency is a ratio of power at a predetermined position within the power receiver 92 to power at a predetermined position in the power transmitter 91. For example, power efficiency may be a ratio of power supplied to the battery 93 to power in the inverter circuit of the power transmitter 91 or a ratio of power supplied to the battery to power supplied from a commercial power supply to the power transmitter 91. Because impedance of the entire wireless power transfer system 90 also changes when a combination of the power transmitter 91 and the power receiver 92 changes, power efficiency in one power receiver can differ according to each power transmitter ID. Also, the impedance of the entire wireless power transfer system 90 may change according to a positional relationship between the power transmitter 91 and the power receiver 92 even for the same combination of the power transmitter 91 and the same power receiver 92.

An average amount of charge is an average value of an amount of charge in one power feeding operation (during a period from a start to an end of the power feeding). A method of calculating an average amount of charge is not limited. For example, the average amount of charge may be an average value of instantaneous amounts of charge obtained at predetermined time intervals during power feeding or a value obtained by dividing a total amount of charge by a charging time. In the wireless power transfer system 90, heat loss occurs due to a resistance component of each element, a cable between the elements, or the like. Due to this heat, a temperature of each device of the wireless power transfer system 90 rises, and characteristics of the element (for example, characteristics of coils of pads of the power transmission side and the power reception side) change. Because a temperature rise changes with time due to an accumulation of generated heat, the average amount of charge can also change.

An error probability is a ratio of the number of power feeding failures to the number of times that a power transmitter with the same ID is used. For example, if power feeding in a power transmitter with a certain ID has been previously attempted 20 times and the power feeding failed once during the 20 attempts, the error probability of the power transmitter is 5%. Factors which cause power feeding to fail include overvoltage, overcurrent, abnormality in temperature, abnormality in power efficiency, abnormality in communication between a power transmitter and a power receiver, and abnormality in hardware or software inside the power transmitter or the power receiver. Even in power transmitters with the same ID or power receivers with the same ID, there may be variations in elements among the individual devices and therefore the power feeding may succeed or fail. Also, the power feeding may succeed or fail due to a combination of a power transmitter and a power receiver, a power feeding environment, and/or the like.

An allowable amount of positional shift is an amount of positional shift between a power transmitter and a power receiver when the power feeding has succeeded. This amount of shift can be acquired from a wireless power transfer system (more specifically, the power transmitter or the power receiver). This amount of shift may be an amount of shift in a longitudinal direction of a moving object or an amount of shift in a width direction (a direction orthogonal to the longitudinal direction) of the moving object, or may be calculated from the amounts of shift in these two directions. In FIG. 6, only an amount of shift in one of these two directions is assumed to be described.

From FIG. 6, for example, it can be seen that IDs of power transmitters from which the moving object has received fed power are "111," "112," "114," and "116." Also, it can be seen that the power transmitter with the ID "114" is best from the viewpoint of power efficiency and that the power transmitter with the ID "112" is best from the viewpoint of an average amount of charge. Also, it can be seen that the power transmitter with the ID "116" is best from the viewpoint of an error probability and the power transmitter with the ID "111" is best from the viewpoint of an allowable amount of positional shift.

Also, a configuration of the history storage unit 11 is not limited to the example in FIG. 6. For example, other items may be added to the usage history, some of the items illustrated in FIG. 6 may be omitted as necessary, or any normalization or redundancy may be performed on the usage history. For example, the usage history may include a success rate instead of the error probability. Also, in FIG. 6, a record is generated for each power transmitter ID, but a new record may be recorded in the history storage unit 11 every time power feeding is performed. In this case, a date and time when the power feeding is performed are added as items of the usage history, and results of one power feeding operation are indicated in the fields of the power efficiency, the average amount of charge, and the amount of positional shift. Further, instead of the error probability, an error flag indicating whether or not the power feeding has failed is set as an item of the usage history. An average value of power efficiency, an average value of the average amount of charge, and the error probability are obtained by aggregating records of the same power transmitter ID.

The search unit 12 is a functional element that extracts a charging station having the power transmitter 91 from which the power receiver 92 can receive fed power. The search unit 12 is implemented by the CPU 101 executing an information providing program installed in the terminal 10, reading and writing data from and to the main storage unit 102 or the auxiliary storage unit 103, and controlling the communication control unit 104. The search unit 12 also controls the input device 105 and the output device 106 as necessary. An activation timing of the search unit 12 is not limited. For example, the search unit 12 may start a series of processes on the basis of an instruction input by the user via a user interface of the terminal 10 (for example, a screen displayed on the terminal 10), or may be activated on the basis of an instruction signal received from another functional element (not illustrated) within the terminal 10.

First, the search unit 12 generates a request signal for acquiring a power receiver ID to transmit the generated signal to the power receiver 92 and receives the power receiver ID sent from the power receiver 92 in response to the request signal. Subsequently, the search unit 12 accesses the database 20 via the communication network N and extracts one or more power transmitter IDs corresponding to the acquired power receiver ID from the device table 22. Through this processing, the power transmitter 91 corresponding to the power receiver 92 is identified. For example, if the search unit 12 searches the device table 22 with a power receiver ID "203" on the assumption that the device table 22 stores the data illustrated in FIG. 5, the search unit 12 extracts the power transmitter IDs "111." "112," "113," and "114" from the device table 22. Also, when there is compatibility in all combinations of the power receivers and the power transmitters, the search unit 12 can determine that any power transmitter 91 corresponds to the power receiver 92 without accessing the device table 22.

The search unit 12 may search for a charging station using the extracted power transmitter ID as is. Alternatively, the search unit 12 may refer to the history storage unit 11 to select one or more power transmitter IDs from the extracted power transmitter IDs and search for charging stations using only the selected power transmitter IDs. A technique of selecting a power transmitter ID with reference to the history storage unit 11 will be described below.

The search unit 12 may select only power transmitter IDs stored in the history storage unit 11 from among the one or more power transmitter IDs extracted from the device table 22 and discard power transmitter IDs not stored in the history storage unit 11. This means that only previously used power transmitter IDs are used for a search of a charging station. For example, it is assumed that the device table 22 stores the data illustrated in FIG. 5 and the history storage unit 11 stores the data illustrated in FIG. 6. When the search unit 12 acquires the power receiver ID "203" under this condition, the search unit 12 first extracts the power transmitter IDs "111," "112," "113," and "114" from the device table 22. Subsequently, the search unit 12 compares the four power transmitter IDs with power transmitter IDs stored in the history storage unit 11, thereby discarding the power transmitter ID "113" and selecting only the power transmitter IDs "111," "112," and "114."

The search unit 12 may finally select only one or more power transmitter IDs for which power feeding performance satisfies a reference value with reference to the history storage unit 11. A technique of selecting a power transmitter IDs on the basis of power feeding performance is not limited and various techniques are considered as shown in the following example.

For example, the search unit 12 may select only a power transmitter ID for which power efficiency is greater than or equal to a threshold value Ta (for example, Ta=90(%) or select only a power transmitter ED for which an average amount of charge is greater than or equal to a threshold value Tb (for example, Tb=3.0 (kW·s)). Alternatively, the search unit 12 may select only a power transmitter ID for which an error probability is less than a threshold value Tc (for example, Tc=5(%)) or may select only a power transmitter ID for which an allowable amount of positional shift is greater than or equal to a threshold value Td (for example, Td=80 mm or more). Alternatively, the search unit 12 may exclude a power transmitter ID for which power feeding has not yet succeeded (that is, a power transmitter ID with an error probability of 100%). Alternatively, the search unit 12 may select only one or more power transmitter IDs for which power efficiency, an average amount of charge, or an allowable amount of positional shift is greatest or select only one or more power transmitter IDs having a lowest error probability.

Alternatively, the search unit 12 may select a power transmitter ID on the basis of a plurality of items related to the power feeding performance. For example, the search unit 12 may select only a power transmitter ID for which power efficiency is greater than or equal to the threshold value Ta and an average amount of charge is greater than or equal to the threshold value Tb. Alternatively, the search unit 12 may select only a power transmitter ID for which an average amount of charge is greater than or equal to the threshold value Tb and an error probability is less than the threshold value Tc. Alternatively, the search unit 12 may select only a power transmitter ID for which power efficiency is greater than or equal to the threshold value Ta, an error probability is less than the threshold value Tc, and an allowable amount of positional shift is greater than or equal to the threshold value Td. A combination of items related to the power feeding performance for narrowing down the power transmitter ID is constituted of two or more arbitrary items in the usage history.

Alternatively, the search unit 12 may generate a score for any one of the items of power feeding performance (the power efficiency, the average amount of charge, the error probability, and the allowable amount of positional shift) by an any technique and select a power transmitter ID for which a total score is greater than or equal to a threshold value Te. A combination of items related to the power feeding performance to be subjected to score conversion is constituted of two or more arbitrary items in the usage history.

If no power transmitter ID can be selected as a result of referring to the history storage unit 11, the search unit 12 may finally select all of the power transmitter IDs extracted from the device table 22 for the search of a charging station. As a case in which no power transmitter ID can be selected, a case in which there is no record in the usage history, a case in which there is no power transmitter ID satisfying the threshold value related to the power feeding performance, or the like is considered.

The search unit 12 may present the user with a user interface for designating one or more power transmitter IDs, and may store only a power transmitter ID selected by the user via the user interface. When the history storage unit 11 is not used, the search unit 12 presents a power transmitter ID extracted from the device table 22 to the user as an option. Thereby, for example, the user can select a power transmitter having the same ID as a power transmitter installed at his or her home. Also, when there is compatibility in all combinations of the power receivers and the power transmitters, the search unit 12 may present all power transmitter IDs to the user as an option. When the history storage unit 11 is used, the search unit 12 may present the power transmitter ID selected on the basis of the usage history to the user as an option. Alternatively, when the history storage unit 11 is used, the search unit 12 allows the user to designate desired power transmitter IDs before referring to the history storage unit 11 to finally select one or more power transmitter IDs on the basis of the usage history from among the designated power transmitter IDs.

In this manner, there are various techniques of selecting a power transmitter ID for searching for a charging station. In any case, if one or more power transmitter IDs are selected, the search unit 12 extracts one or more charging stations corresponding to the power transmitter ID from the station table 21. A method of extracting a charging station is not limited to one and various methods can be considered.

For example, the search unit 12 may extract a charging station corresponding to at least one of the identified power transmitter IDs from the station table 21. The station table 21 is assumed to store data illustrated in FIG. 4, and the search unit 12 extracts charging stations A, B, D, and E if the selected power transmitter ID is "111," extracts the charging stations A and C if the selected power transmitter IDs are "112" and "113," and extracts the charging stations A to E if the selected power transmitter IDs are "111," "112," and "114."

Alternatively, the search unit 12 may extract a charging station using conditions other than the power transmitter ID. For example, the search unit 12 may extract a charging station that corresponds to the selected power transmitter ID and satisfies a reference value related to the unit price or campaign designated by the user from the station table 21. An example of a criterion related to the price is "a unit price is X yen or less." Also, an example of a criterion related to the campaign (service) is "a membership discount is applied." Of course, the conditions related to the price and campaign (service) are not limited thereto. Alternatively, the search unit 12 may extract a charging station for which the degree of congestion of the selected power transmitter ID is not 100% (that is, a charging station in which the selected power transmitter is available) from the station table 21.

The search unit 12 outputs information about a finally extracted charging station as a search result to the output unit 13.

The output unit 13 is a functional element that outputs location information of the charging station extracted by the search unit 12. The output unit 13 is implemented by the CPU 101 executing the information providing program, reading and writing data from and to the main storage unit 102 or the auxiliary storage unit 103, and controlling the output device 106.

An output method is not limited. For example, the output unit 13 may output location information in a form capable of being perceived by a human. For example, the output unit 13 may display a location of the charging station on a screen or output a sound from a speaker. If location information of a charging station is to be displayed on the screen, the output unit 13 may indicate the location of the charging station with any mark, symbol, character, or the like on a map or indicate the location information with any mark, symbol, character, or the like without displaying the map. Alternatively, the output unit 13 may output the location information to another computer system (not illustrated) other than the information providing system 1 via the communication network or may store the location information in a storage device such as a memory or a database.

Figure 7:
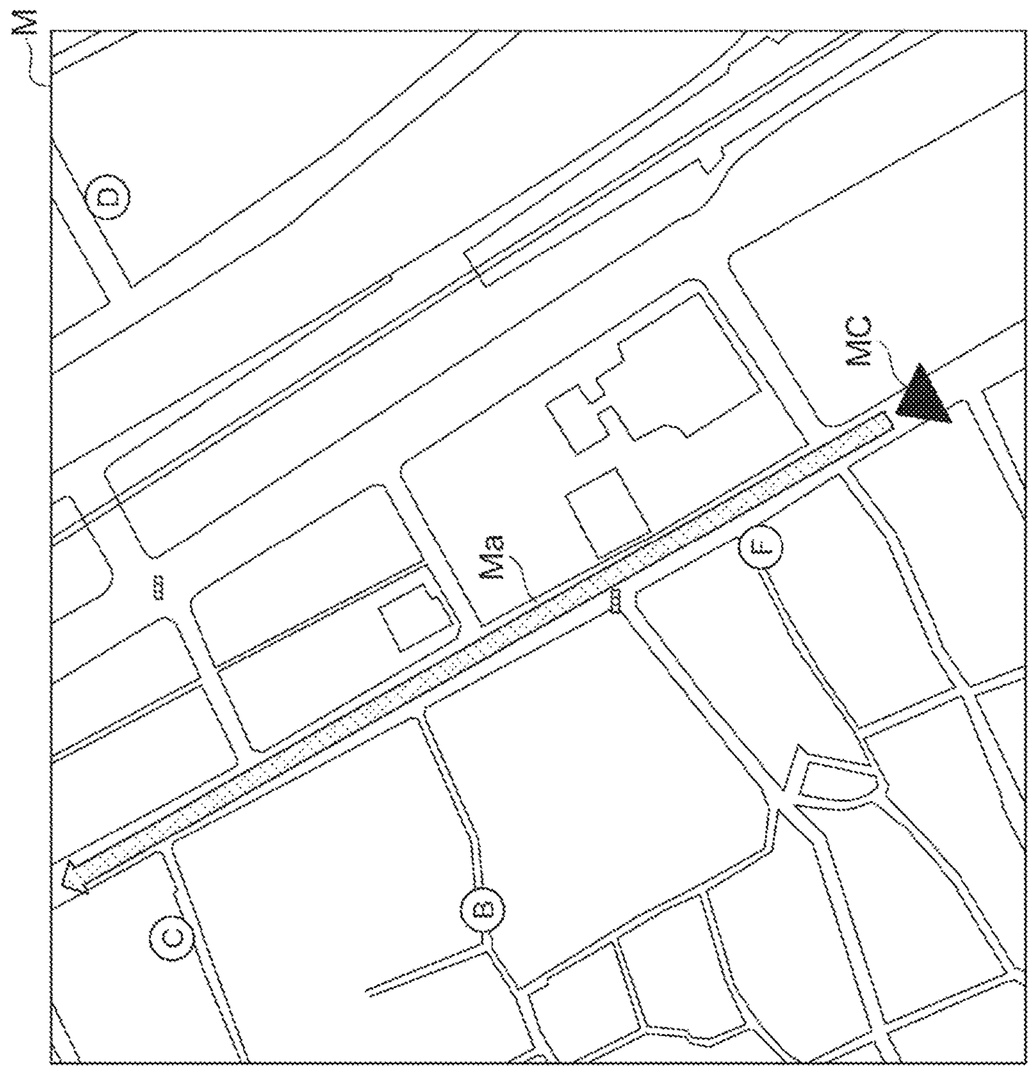
FIG. 7 is a diagram illustrating an example of display of location information of a charging station.
Figure 8:
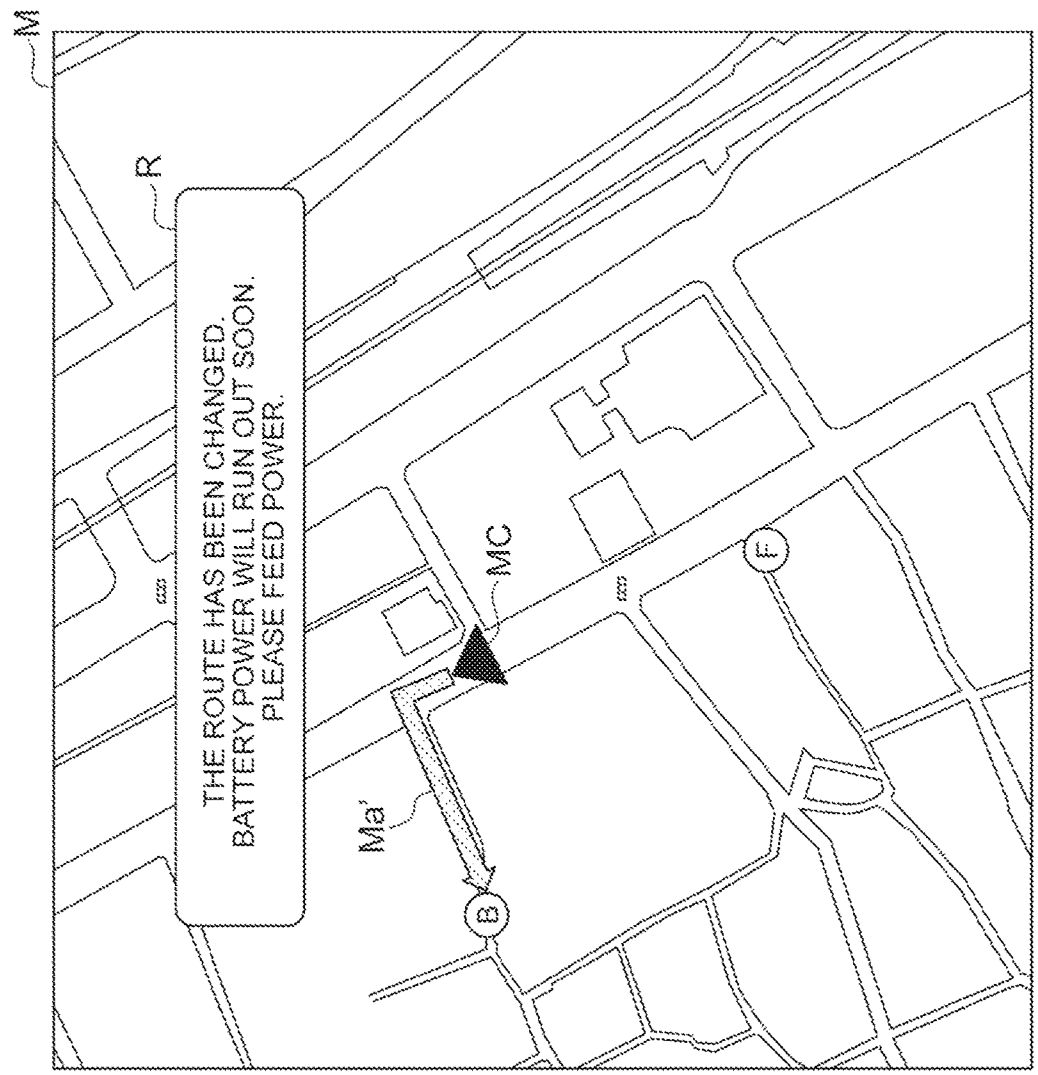
FIG. 8 is a diagram illustrating an example of display of location information of a charging station.

In the embodiment, some aspects in which location information is displayed on a map as in a car navigation system are shown with reference to FIGS. 7 and 8.

In the example of FIG. 7, the output unit 13 displays a current position of the terminal 10 (or a current position of the moving object V) on a map M with a mark MC and displays a guidance route set by a car navigation system with an arrow Ma. Further, the output unit 13 draws a mark indicating a location of a charging station on the screen (see enclosed characters "B," "C," "D," and "F" in FIG. 7).

The output unit 13 may arbitrarily determine which one of charging stations identified by the search unit 12 is actually displayed on the screen. For example, the output unit 13 may display locations of all charging stations present within the represented map M. Alternatively, the output unit 13 may display locations of charging stations within a predetermined range (for example, within 500 m or the like) from the current position of the terminal 10 (or the current position of the moving object V). Alternatively, the output unit 13 may display only locations of charging stations present on the guidance route. In this case, only the charging station F in FIG. 7 is drawn on the map. Alternatively, the output unit 13 may display only a location of a charging station within a possible traveling distance calculated on the basis of a remaining amount of charge (a state of charge (SOC)) of the battery 93, i.e., a location of a charging station that the moving object V is able to reach. By indicating the location of the reachable charging station, it is possible to inform the user of the charging station to be visited before the battery 93 runs out.

Alternatively, when the number of reachable charging stations is less than or equal to a threshold value Ts, the output unit 13 may set the nearest charging station as a destination and display a route to the charging station on the map. FIG. 8 illustrates an example of such a route setting. In this example, the output unit 13 displays a route Ma' in which the vehicle can reach the charging station B nearest to the current position of the vehicle, and displays a message R prompting power feeding on the screen. If the guidance route to another destination has already been set, the output unit 13 may temporarily change the guidance route to the route to the nearest charging station. In this manner, by presenting a guidance route to a reachable charging station to the user, it is possible to more reliably prevent a situation where the user encounters running out of battery power of the moving object V.

Second Embodiment

A function and configuration of an information providing system 1A according to the second embodiment will be described with reference to FIG. 9. The second embodiment is different from the first embodiment in that a terminal performs a series of processes without communicating with a power receiver. In the following, matters specific to the second embodiment will be described in detail, and description of matters similar to those of the first embodiment will be omitted.

Figure 9:
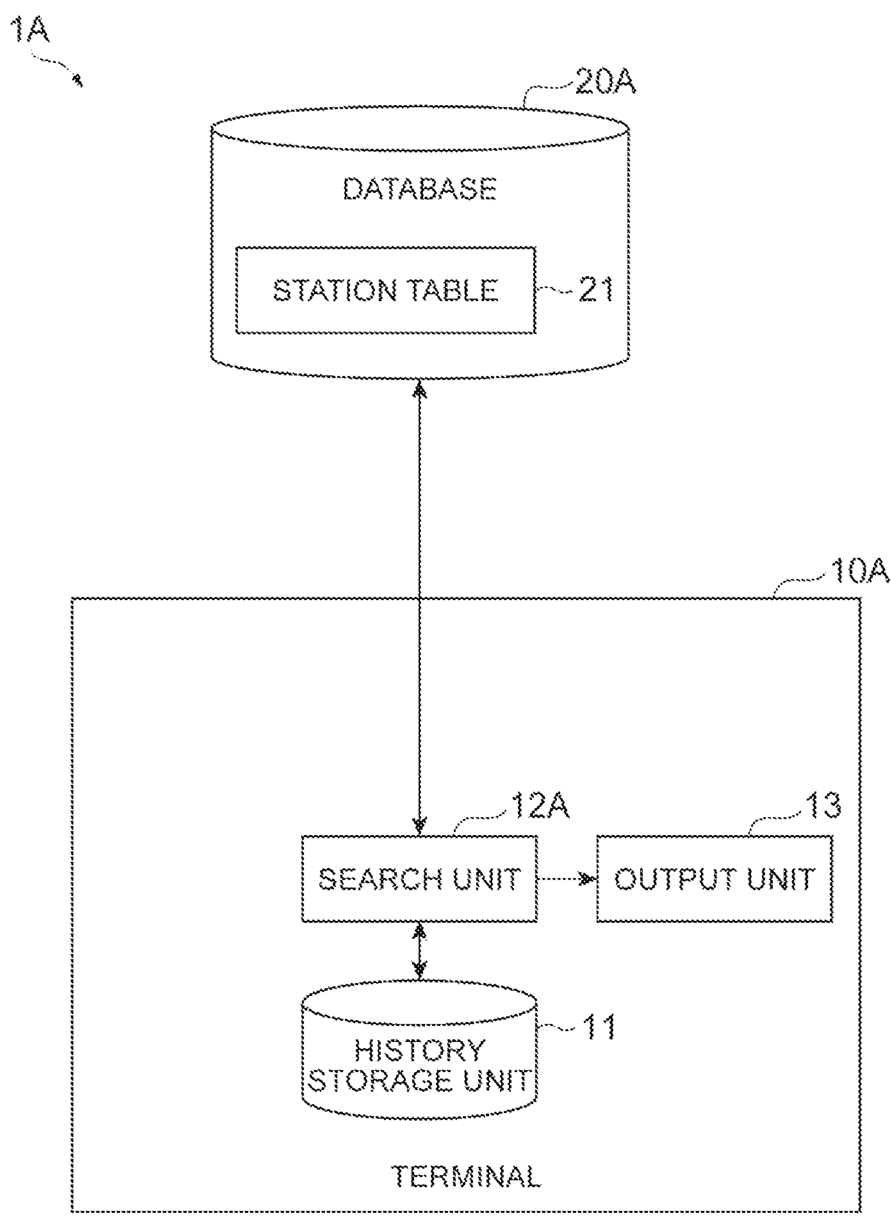
FIG. 9 is a block diagram illustrating a functional configuration of an information providing system according to a second embodiment.

As illustrated in FIG. 9, the information providing system 1A includes a terminal 10A and a database 20A.

The database 20A has the same station table 21 as in the first embodiment. In the present embodiment, the device table 22 in the first embodiment can be omitted.

The terminal 10A includes a history storage unit 11, a search unit 12A, and an output unit 13 as functional components. Because the search unit 12A is different in function from that of the first embodiment, the search unit 12A will be described below.

The search unit 12A is a functional element that extracts a charging station having a power transmitter from which the power receiver can receive fed power. The search unit 12A is implemented by a CPU 101 executing an information providing program installed in the terminal 10A, reading and writing data from and to a main storage unit 102 or an auxiliary storage unit 103, and controlling a communication control unit 104. The search unit 12A also controls an input device 105 and an output device 106 as necessary. As in the first embodiment, an activation timing of the search unit 12A is not limited. The search unit 12A acquires location information of a charging station without using a power receiver ID.

First, the search unit 12A extracts one or more power transmitter IDs from which power has previously been fed, from the history storage unit 11. For example, if the history storage unit 11 stores the data illustrated in FIG. 6, the search unit 12A extracts power transmitter IDs "111," "112," "114," and "116." Also, the search unit 12A may exclude a power transmitter ID for which power feeding has not yet succeeded (i.e., a power transmitter ID for which an error probability is 100%) from an extraction target. Alternatively, similar to the search unit 12 (the first embodiment), the search unit 12A may select only one or more power transmitter IDs for which power feeding performance satisfies a reference value. That is, the search unit 12A may select a power transmitter ID using at least one of a threshold value Ta of power efficiency, a threshold value Tb of an average amount of charge, a threshold value Tc of an error probability, and a threshold value Td of an allowable amount of positional shift. Alternatively, the search unit 12A may select only a power transmitter ID for which a total score obtained on the basis of any item of the power feeding performance is greater than or equal to a threshold value Te.

The search unit 12A may present power transmitter IDs selected on the basis of a usage history to a user as options or allow the user to designate desired power transmitter IDs before referring to the history storage unit 11 to ultimately select one or more power transmitter IDs on the basis of the usage history from among the designated power transmitter IDs. This process is similar to that of the first embodiment.

When one or more power transmitter IDs are selected, the search unit 12A extracts one or more charging stations corresponding to the power transmitter ID from the station table 21. A method of extracting a charging station using a power transmitter ID is similar to that of the first embodiment. Therefore, the search unit 12A may simply extract a charging station corresponding to the power transmitter ID, extract a charging station that satisfies a reference value related to the unit price or campaign, or extract a charging station in consideration of the degree of congestion for each power transmitter ID.

The search unit 12A outputs information of the finally extracted charging station as a search result to the output unit 13. Processing in the output unit 13 is similar to that of the first embodiment.

Third Embodiment

A function and configuration of an information providing system 1B according to the third embodiment will be described with reference to FIGS. 10 and 11. The third embodiment is different from the first embodiment in that a usage history is stored on a database side (center side) instead of a terminal side. Therefore, in the present disclosure, a location of a device that stores the usage history is not limited. In the following, matters specific to the third embodiment will be described in detail, and description of matters similar to those of the first embodiment will be omitted.

Figure 10:
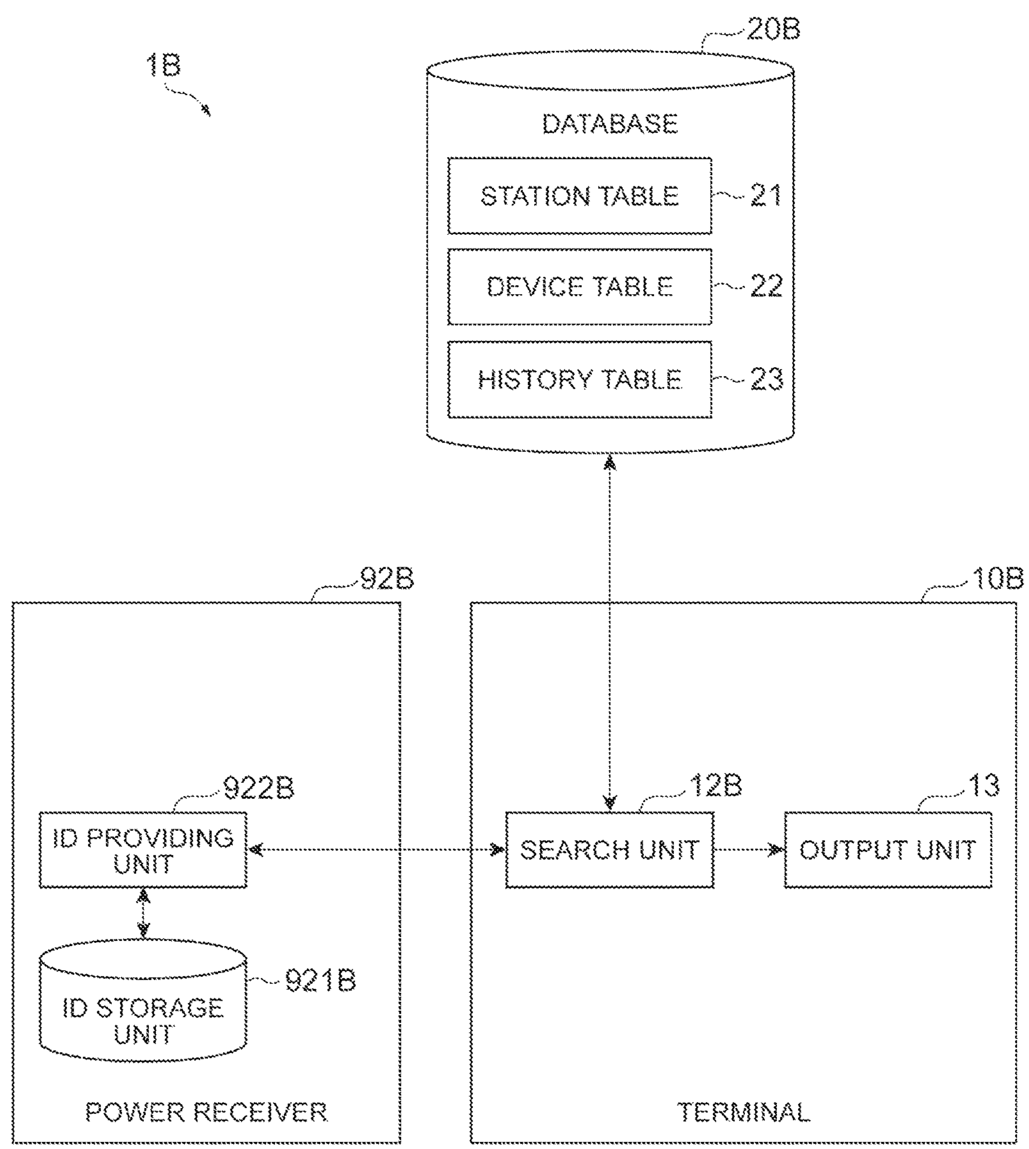
FIG. 10 is a block diagram illustrating a functional configuration of an information providing system according to a third embodiment.

As illustrated in FIG. 10, the information providing system 1B includes a terminal 10B and a database 20B. The terminal 10B communicates with a power receiver 92B.

The database 20B includes a station table 21 and a device table 22 similar to those of the first embodiment and includes a history table 23.

The history table 23 is a collection of usage histories indicating power transmitters previously used by power receivers of moving objects. Similar to the station table 21 and the device table 22, the history table 23 may be a relational database or a CSV file, or may be implemented in other formats.

The usage history is newly registered or updated when power feeding in the wireless power transfer system 90 is completed. For example, when a power transmitter completes power feeding, it transmits information about the power transmitter and the power receiver and a result related to power feeding performance to the database 20B, and thereby the power feeding result is reflected in the history table 23.

FIG. 11 illustrates an example of the usage history. Each record of the usage history includes an ID of a power transmitter used for power feeding, an ID and a serial number of a power receiver receiving fed power (also referred to as a "power receiver S/N" in the present specification), and an actual value of power feeding performance between the power transmitter and the power receiver. In the present embodiment, the power feeding performance is based on an error probability (%) and a previous average value for each of power efficiency (%), an average amount of charge (kW·s), and an allowable amount of positional shift (mm). In the present embodiment, because the usage history is not stored separately for each power receiver, but usage histories related to one or more power receivers are aggregated and stored, the power receiver S/N is used to manage a usage history of each power receiver. From FIG. 11, it can be seen that, for example, a power receiver (in which a power receiver ID is "201") identified by a serial number "000002" receives power fed from a power transmitter with an ID "111" and a power transmitter with an ID "112."

Also, a configuration of the history table 23 is not limited to the example in FIG. 11. For example, other items may be added to the usage history, some of the items illustrated in FIG. 11 may be omitted as necessary, or any normalization or redundancy is performed on the usage history. For example, a new record may be registered in the history table 23 every time power is fed. In this case, a date and time when the power feeding is performed are added as an item of the usage history, and results of one power feeding operation are indicated in the fields of the power efficiency, the average amount of charge, and the allowable amount of positional shift. Further, instead of an error probability, an error flag indicating whether or not the power feeding has succeeded is set as an item of the usage history. An average value of the power efficiency, an average value of the average amount of charge, an average value of the allowable amount of positional shift, and the error probability are obtained by aggregating records in which a combination of a power transmitter ID and a power receiver S/N is the same.

As in the first embodiment, the terminal 10B obtains necessary information from the power receiver 92B by communicating with the power receiver 92B. Therefore, before the detailed description of the terminal 10B, a functional configuration of the power receiver 92B will be described. The power receiver 92B includes an ID storage unit 921B and an ID providing unit 922B as functional components.

The ID storage unit 921B is a functional element that stores an ID and a serial number of the power receiver 92B and is implemented by a memory. The power receiver S/N is an identifier for distinguishing each power receiver.

The ID providing unit 922B is a functional element that provides the power receiver ID and the power receiver S/N to the terminal 10B and is implemented by a processor executing a predetermined program installed in the power receiver 92B. When receiving a request signal from the terminal 10B, the ID providing unit 922B reads the power receiver ID and the power receiver S/N from the ID storage unit 921B, and transmits these data to the terminal 10B. When a communication connection with the terminal 10B has been established, the power receiver 92B (the ID providing unit 922B) may provide the power receiver ID and the power receiver S/N to the terminal 10B even when there is no request from the terminal 10B.

Next, a functional configuration of the terminal 10B will be described. The terminal 10B includes a search unit 12B and an output unit 13 as functional components.

The search unit 12B is a functional element that extracts a charging station having a power transmitter from which fed power can be received by the power receiver. The search unit 12B is implemented by an CPU 101 executing an information providing program installed in the terminal 10B, reading and writing data from and to a main storage unit 102 or an auxiliary storage unit 10B, and controlling a communication control unit 104. The search unit 12B also controls an input device 105 and an output device 106 as necessary. As in the first embodiment, an activation timing of the search unit 12B is not limited.

First, the search unit 12B generates a request signal for acquiring a power receiver ID and a power receiver S/N, transmits the generated signal to the power receiver 92B, and receives the power receiver ID and the power receiver S/N from the power receiver 92B in response to the request signal. Subsequently, the search unit 12B extracts one or more power transmitter IDs corresponding to the acquired power receiver ID from the device table 22. By this processing, a power transmitter corresponding to the power receiver 92B is identified.

The search unit 12B may search for a charging station using the extracted power transmitter ID as is. Alternatively, the search unit 12B may refer to the history table 23 to select one or more power transmitter IDs from the extracted power transmitter IDs and search for charging stations using only the selected power transmitter IDs. A technique of selecting a power transmitter ID with reference to the history table 23 will be described below.

The search unit 12B identifies a previously used power transmitter ID by reading a record corresponding to a combination of the extracted power transmitter ID and a power receiver S/N from the history table 23. For example, the device table 22 stores the data illustrated in FIG. 5, and the history table 23 stores the data illustrated in FIG. 11. Under this condition, when the search unit 12B acquires a power receiver ID "203" and a power receiver S/N "000113," the search unit 12B first extracts power transmitter IDs "111," "112," "113," and "114" corresponding to the power receiver ID "203" from the device table 22. Subsequently, the search unit 12B retains at least a power transmitter ID "112" on the basis of the four power transmitter IDs and the power receiver S/N "000113."

The search unit 12B may exclude a power transmitter ID for which power feeding has not yet succeeded (i.e., a power transmitter ID with an error probability of 100%) from the extraction target. Alternatively, the search unit 12B may select only one or more power transmitter Ds for which power feeding performance satisfies a reference value. That is, the search unit 12B may select only a power transmitter ID using at least one of a threshold value Ta of a power efficiency, a threshold value Tb of an average amount of charge, a threshold value Tc of an error probability, and a threshold value Td of an allowable amount of positional shift. Alternatively, the search unit 12B may select a power transmitter ID on the basis of a plurality of items related to power feeding performance. Alternatively, the search unit 12B may select only a power transmitter ID for which a total score obtained on the basis of any item of power feeding performance is greater than or equal to a threshold value Te.

If no power transmitter ID can be selected as a result of referring to the history table 23, the search unit 12B may finally retain a power transmitter ID extracted from the device table 22 to search for a charging station, as in the first embodiment.

As in the first embodiment, the search unit 12B may present the user with a user interface for designating one or more power transmitter IDs and retain only a power transmitter ID selected by the user via the user interface. If the history table 23 is not used, the search unit 12B presents the user with a power transmitter ID extracted from the device table 22 as an option. If the history table 23 is used, the search unit 12B may present the user with a power transmitter ID selected on the basis of the usage history as an option. Alternatively, if the history table 23 is used, the search unit 12B may allow the user to designate desired power transmitter IDs before referring to the history table 23 to finally select one or more power transmitter IDs from among the designated power transmitter IDs on the basis of the usage history.

After selecting one or more power transmitter IDs, the search unit 12B extracts one or more charging stations corresponding to the power transmitter ID from the station table 21. A method of extracting a charging station using a power transmitter ID is similar to that of the first embodiment. Therefore, the search unit 12B may simply extract a charging station corresponding to the power transmitter ID, extract a charging station that satisfies a reference value related to the unit price or the campaign, or extract a charging station in consideration of the degree of congestion for each power transmitter ID.

The search unit 12B outputs information of the finally extracted charging station to the output unit 13 as a search result. Processing in the output unit 13 is similar to that in the first embodiment.

In the above description of the embodiment, a power receiver ID and a power receiver S/N are used as items related to the power receiver within the usage history, but the power receiver may be identified only by the power receiver ID without using the power receiver S/N. For example, if it is only necessary to determine compatibility with a power transmitter or compatibility based on power feeding performance for each type of power receiver instead of each power receiver, it is unnecessary to use the power receiver S/N. In this modification, the power receiver S/N item can be omitted in the history table 23. Also, the power receiver 92B may store and provide only a power receiver ID. The search unit 12B obtains information of the charging station by executing a process similar to the above-described process using the power receiver ID.

Fourth Embodiment

A function and configuration of an information providing system 1C according to the fourth embodiment will be described with reference to FIG. 12. The fourth embodiment is a further modification of the third embodiment. The fourth embodiment is different from the third embodiment in that a server, not a terminal, has a function corresponding to a search unit. In the following, matters specific to the fourth embodiment will be described in detail, and description of matters similar to those of the third embodiment will be omitted.

Figure 12:
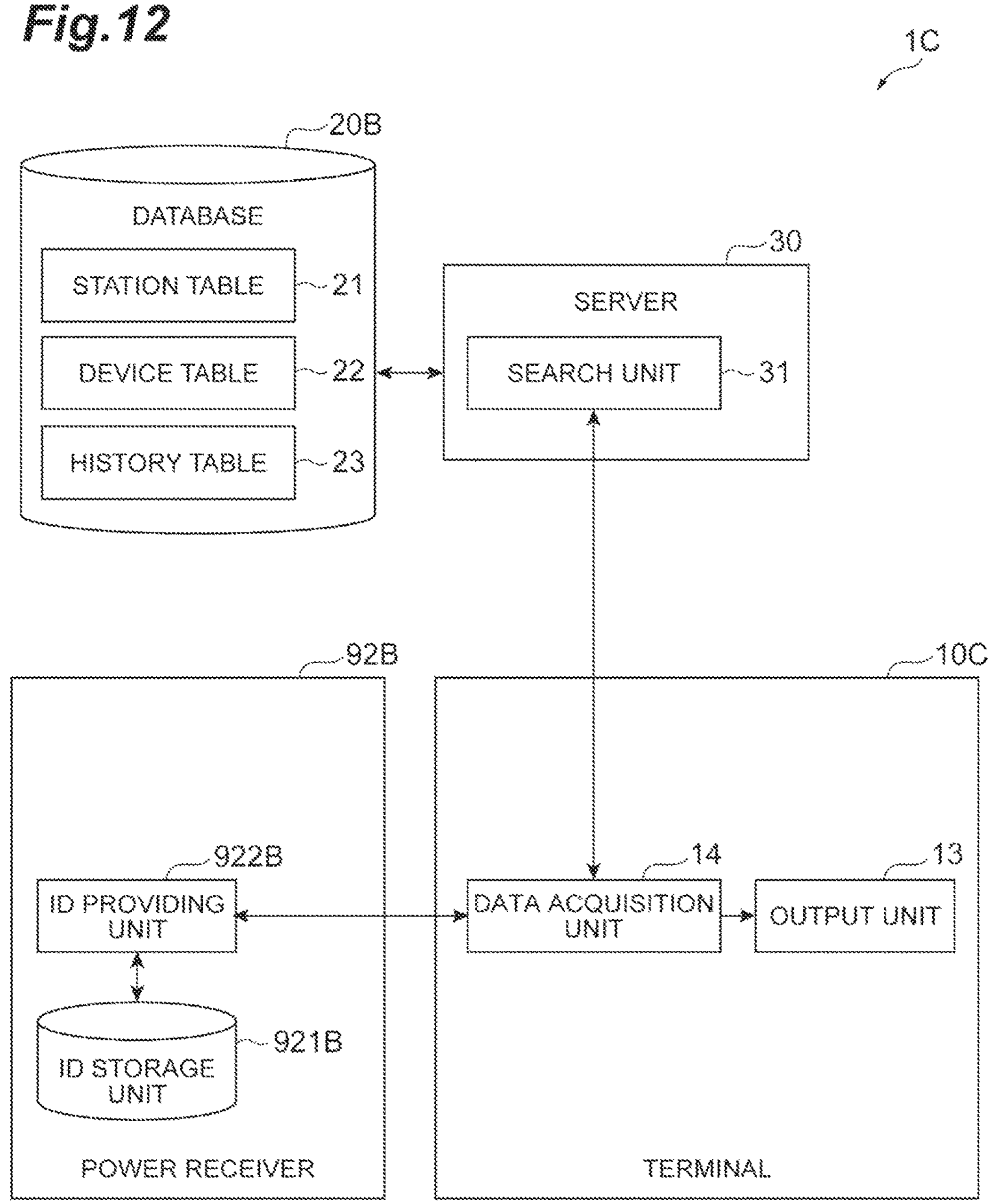
FIG. 12 is a block diagram illustrating a functional configuration of an information providing system according to a fourth embodiment.

As illustrated in FIG. 12, the information providing system 1C includes a terminal 10C, a database 20B, and a server 30. The terminal 10C communicates with a power receiver 92B. Components different from those of the third embodiment are the terminal 10C and the server 30.

The terminal 10C includes a data acquisition unit 14 and an output unit 13 as functional components.

The data acquisition unit 14 is a functional element that acquires, from the server 30, location information of a charging station having a power transmitter from which fed power can be received by a power receiver. The data acquisition unit 14 is implemented by a CPU 101 executing an information providing program installed in the terminal 10C, reading and writing data from and to a main storage unit 102 or an auxiliary storage unit 103, and controlling a communication control unit 104. An activation timing of the data acquisition unit 14 is not limited. For example, the data acquisition unit 14 may start a series of processes on the basis of an instruction input by a user via a user interface of the terminal 10C, or may be activated on the basis of an instruction signal received from another functional element (not illustrated) in the terminal 10C.

First, the data acquisition unit 14 generates a request signal for acquiring a power receiver ID and a power receiver S/N, transmits the generated signal to the power receiver 92B, and receives the power receiver ID and the power receiver S/N transmitted from the power receiver 92B in response to the request signal. Also, the data acquisition unit 14 may receive the power receiver ID and the power receiver S/N from the power receiver 92B without generating and transmitting the request signal. Subsequently, the data acquisition unit 14 generates a search request including the power receiver ID and the power receiver S/N and transmits the request to the server 30. Thereafter, the data acquisition unit 14 receives a search result sent from the server 30 in response to the search request. The search result includes location information of one or more charging stations that are finally extracted. The data acquisition unit 14 outputs the received search result to the output unit 13. Processing in the output unit 13 is similar to that of the third embodiment.

On the other hand, the server 30 includes a search unit 31 as a functional component. A hardware configuration of the server 30 is similar to the configuration of the terminal illustrated in FIG. 2, but a mounted hardware module may certainly be different from the terminal. For example, modules such as a CPU, a memory, and a network card mounted on the server 30 may have higher performance than those of the terminal 10C. In general, a keyboard and a mouse are used as an input device of the server 30, and a monitor is used as an output device. A method of implementing the functional elements of the server 30 using hardware can be considered as in the case of the terminal.

The search unit 31 is a functional element that extracts a charging station having a power transmitter from which fed power can be received by the power receiver. The search unit 31 is implemented by the CPU executing an information providing program installed in the server 30, reading and writing data from and to a main storage unit or an auxiliary storage unit, and controlling a communication control unit.

When receiving a search request from the terminal 10C, the search unit 31 extracts one or more power transmitter IDs corresponding to a power receiver ID included in the search request from a device table 22. By this processing, a power transmitter corresponding to the power receiver 92B is identified.

The search unit 31 may search for a charging station using the extracted power transmitter ID as is. Alternatively, the search unit 31 may refer to a history table 23 to select one or more power transmitter IDs from the extracted power transmitter IDs and search for the charging station using only the selected power transmitter IDs. A technique of selecting a power transmitter ID with reference to the history table 23 will be described below.

The search unit 31 identifies a previously used power transmitter ID by reading a record corresponding to a combination of the extracted power transmitter ID and the power receiver S/N included in the search request, from the history table 23. The search unit 31 may exclude a power transmitter ID for which power feeding has not yet succeeded (i.e., a power transmitter ID with an error probability of 100%) from the extraction target. Alternatively, the search unit 31 may select only one or more power transmitter IDs for which power feeding performance satisfies a reference value. As in the third embodiment, the selection method is not limited as described above.

If no power transmitter ID can be selected as a result of referring to the history table 23, the search unit 31 may finally select a power transmitter ID extracted from the device table 22 to search for a charging station. This is also similar to that of the third embodiment.

The search unit 31 may cause the terminal 110C to display a user interface for designating one or more power transmitter IDs and receive only a power transmitter ID selected by the user via the user interface from the terminal 10C. In the present embodiment, communication occurs between the terminal 10C and the server 30 for this processing. Except for this point, the present embodiment is similar to the third embodiment.

When selecting one or more power transmitter IDs, the search unit 31 extracts one or more charging stations corresponding to the power transmitter IDs from the station table 21. A method of extracting a charging station using a power transmitter ID is similar to that of the first embodiment. Therefore, the search unit 31 may simply extract a charging station corresponding to the power transmitter ID, extract a charging station that satisfies a reference value related to the unit price or the campaign, or extract a charging station in consideration of the degree of congestion for each power transmitter ID. The search unit 31 transmits information of the finally extracted charging station as a search result to the terminal 10C.

Figure 13:
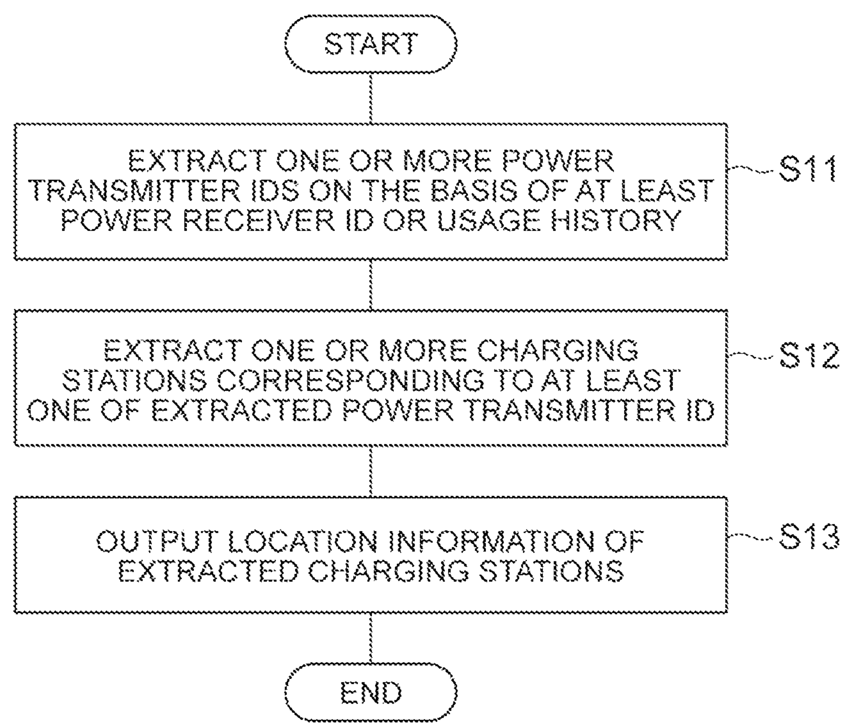
FIG. 13 is a flowchart illustrating an operation of the information providing systems according to the first to fourth embodiments.

The first to fourth embodiments have been described above, and the processes of these embodiments can be summarized as illustrated in FIG. 13. FIG. 13 is a flowchart illustrating an information providing method according to the present disclosure that is executed by the information providing system 1, 1A, 1B, or 1C.

First, one or more power transmitter IDs are extracted on the basis of at least a power receiver ID or a usage history (step S11, search step). For example, the power transmitter ID may be extracted on the basis of a power receiver ID without using the usage history or the power transmitter ID may be extracted on the basis of the usage history without using the power receiver ID. Alternatively, the power transmitter ID may be extracted on the basis of both the power receiver ID and the usage history. If the usage history is used, only a power transmitter ID satisfying a certain standard of power feeding performance may be extracted. Various techniques can be taken with respect to the extraction of the power transmitter ID as described and shown in the above-described embodiments.

Subsequently, one or more charging stations corresponding to at least one of the extracted power transmitter IDs are extracted (step S12, search step). Various techniques can be taken with respect to the extraction of the charging station as shown in the above-described embodiments.

Then, location information of the extracted charging station is output (step S13, output step). For example, as illustrated in FIGS. 7 and 8, the location information is drawn on a map. As described above, a method of outputting location information varies.

Figure 14:
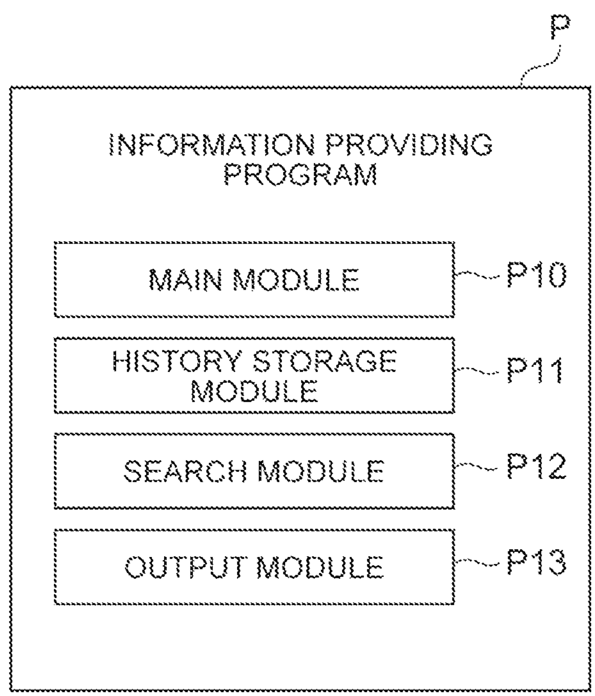
FIG. 14 is a diagram illustrating a configuration of an information providing program according to an embodiment.

Next, an information providing program P for implementing the information providing systems 1, 1A, 1B, and 1C will be described with reference to FIG. 14.

The information providing program P includes a main module P10, a history storage module P11, a search module P12, and an output module P13. The main module P10 is a part that generally controls a charging station searching function. Functions implemented by executing the history storage module P11, the search module P12, and the output module P13 are similar to the functions of the history storage unit, the search unit (and the data acquisition unit), and the output unit in the above-described embodiments. If functional components are divided among a plurality of computers as in the information providing system 1C according to the fourth embodiment, necessary modules are provided in each computer.

The information providing program P may be provided after being fixedly recorded on a tangible recording medium such as a CD-ROM, a DVD-ROM, a semiconductor memory, or the like. Alternatively, the information providing program P may be provided via a communication network as a data signal superimposed on carrier waves.

As described above, an information providing system according to an aspect of the present disclosure is an information providing system for providing information about a wireless power transfer system including a power receiver mounted on a moving object and one or more power transmitters installed in one or more charging stations, the information providing system including: a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit.

An information providing method according to an aspect of the present disclosure is an information providing method to be executed by a computer system for providing information about a wireless power transfer system including a power receiver mounted on a moving object and one or more power transmitters installed in one or more charging stations, the information providing method including: a search step of extracting location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output step of outputting the location information of the charging station extracted in the search step.

An information providing program according to an aspect of the present disclosure is an information providing program for causing a computer to function as an information providing system for providing information about a wireless power transfer system including a power receiver mounted on a moving object and one or more power transmitters installed in one or more charging stations, the computer functioning as: a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit.

In this aspect, because location information of a charging station having a power transmitter previously used by the power receiver, i.e., a power transmitter previously selected by a user, is extracted, it is possible to present a charging station that meets a requirement of the user of a moving object. If the user has previously selected a power transmitter, the probability that the user will try to reuse the power transmitter is high. Therefore, it is possible to present a location of a charging station that seems to be desired by the user without causing the user to search for the charging station many times (in other words, a search request does not occur many times in the information providing system), by referring to the usage history.

Even when a combination of the power transmitter and the power receiver is the same in the wireless power transfer system, the power feeding performance may change due to various factors such as a place where the power transmitter is attached and a size of the moving object to which the power receiver is attached. For example, the power feeding performance may change according to whether the power transmitter is buried in a road, a height of a vehicle, or the like. Therefore, it is useful to refer not only to specifications of both the power receiver and the power transmitter, but also to the usage history which is a result of power feeding that is actually performed. By using the usage history, a charging station where a power transmitter that meets a requirement of the user (for example, a power transmitter capable of feeding power, a power transmitter having good compatibility with the power receiver of the user, or the like) is installed can be presented to the user.

In the information providing system according to another aspect, the station information may further indicate a price or a service related to power feeding of each charging station, and the search unit may extract location information of a charging station in which a power transmitter capable of feeding power to the power receiver is installed and at least one of a price and a service of which satisfies a reference value. In general, a price of receiving a service of power feeding or the service is a concern for the user of the moving object. Therefore, the convenience of the information providing system can be expected to be improved by providing the user with the location information of the charging station the price or the service of which satisfies the reference value.

In the information providing system according to another aspect, the usage history may further indicate an actual value of power feeding performance of each power transmitter, and the search unit may extract location information of a charging station having a power transmitter in which an actual value of power feeding performance satisfies a reference value. As described above, the power feeding performance of the wireless power transfer system can vary due to various factors. Therefore, the convenience of the information providing system can be expected to be improved by providing location information of a charging station having a power transmitter satisfying the fixed standard of power feeding performance.

In the information providing system according to another aspect, the output unit may display the extracted location information of the charging station on a map. By displaying the location information on the map, it is possible to notice the user of the location of the charging station in an easy-to-understand manner.

In the information providing system according to another aspect, the output unit may display only location information of a charging station that the moving object is able to reach among the extracted location information of the charging stations. By displaying only charging stations that the moving object is able to reach, it is possible to more reliably avoid running out of battery power of the moving object.

In the information providing system according to another aspect, when the number of charging stations that the moving object is able to reach is less than or equal to a threshold value, the output unit may display a route to a nearest charging station from a current position of the moving object. When the number of reachable charging stations is reduced, it is possible to more reliably avoid running out of battery power of the moving object by guiding the route to the nearest charging station.

A power receiver according to an aspect of the present disclosure is a power receiver which is mounted on a moving object and is able to receive power fed from a power transmitter in a wireless power transfer system including one or more power transmitters installed in one or more charging stations, the power receiver including: an ID storage unit configured to store a power receiver ID for identifying the power receiver; and an ID providing unit configured to output the power receiver ID to an information providing system that provides information about the wireless power transfer system, wherein the information providing system extracts location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver, by using the power receiver ID output from the ID providing unit, and wherein the information providing system outputs the extracted location information of the charging station.

In this aspect, because the location information of a charging station having the power transmitter previously used by the power receiver, i.e., the power transmitter previously selected by a user, is extracted, it is possible to present a charging station that meets a requirement of the user. Also, a power transmitter predicted to have good compatibility with the power receiver can be expected to be reliably identified by using the power receiver ID.

The present disclosure has been described in detail on the basis of the embodiments thereof. However, the present disclosure is not limited to the above-described embodiments. Various modifications can be made without departing from the gist and scope of the present disclosure.

The fourth embodiment is a modification of the third embodiment, but a technique of providing the search unit in a server instead of the terminal can also be applied to the above-described first or second embodiment. In other words, even when the terminal has a history storage unit or even when a power receiver ID is not used, a server may be provided and a search unit of the server may extract a charging station.

In each of the above-described embodiments, the information providing system includes a database, but the arrangement manner of the database is not limited thereto. For example, the database may be in another information processing system, and as long as the terminal can access the database via a communication network, a location of the database is not limited. Alternatively, the terminal may include the database. Because the terminal is equipped with the database, location information of a charging station can be extracted without using a communication network. When the terminal includes the database, the database may be synchronized with a central database to obtain the latest data.

INDUSTRIAL APPLICABILITY

According to an aspect of the present disclosure, it is possible to present a charging station that meets a requirement of a user of a moving object using a wireless power transfer system.

REFERENCE SIGNS LIST

V Moving object
1, 1A, 1B, 1C Information providing system
10, 10A, 10B, 10C Terminal
11 History storage unit
12, 12A, 12B Search unit
13 Output unit
14 Data acquisition unit
20, 20A, 20B Database
21 Station table
22 Device table
23 History table
30 Server
31 Search unit
90 Wireless power transfer system
91 Power transmitter
92, 92B Power receiver
921, 921B ID storage unit
922, 922B ID providing unit
P Information providing program
P10 Main module
P11 History storage module
P12 Search module
P13 Output module

The invention claimed is:

1. An information providing system for providing information about a wireless power transfer system including a power receiver mounted on a moving object and one or more power transmitters installed in one or more charging stations, the information providing system comprising:
- a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and
- an output unit configured to output the location information of the charging station extracted by the search unit,
- wherein the usage history further indicates an actual value of power feeding performance of each of the power transmitters, and
- wherein the search unit extracts the location information of the charging station having the power transmitter in which the actual value of the power feeding performance satisfies a reference value.

2. The information providing system according to claim 1,
- wherein the station information further indicates a price or a service related to power feeding of each of the charging stations, and
- wherein the search unit extracts location information of a charging station in which a power transmitter capable of feeding power to the power receiver is installed and at least one of the price and the service of which satisfies a reference value.

3. The information providing system according to claim 1, wherein the output unit displays the extracted location information of the charging station on a map.

4. The information providing system according to claim 3, wherein the output unit displays only location information of a charging station that the moving object is able to reach among the extracted location information of the charging stations.

5. The information providing system according to claim 4, wherein, when the number of charging stations that the moving object is able to reach is less than or equal to a threshold value, the output unit displays a route to a nearest charging station from a current position of the moving object.

6. A power receiver which is mounted on a moving object and is able to receive power fed from a power transmitter in a wireless power transfer system including one or more power transmitters installed in one or more charging stations, the power receiver comprising:
- an ID storage unit configured to store a power receiver ID for identifying the power receiver; and
- an ID providing unit configured to output the power receiver ID to an information providing system that provides information about the wireless power transfer system,
- wherein the information providing system extracts location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver, by using the power receiver ID output from the ID providing unit,
- wherein the information providing system outputs the extracted location information of the charging station,
- wherein the usage history further indicates an actual value of power feeding performance of each of the power transmitters, and
- wherein the information providing system extracts the location information of the charging station having the power transmitter in which the actual value of the power feeding performance satisfies a reference value.

7. An information providing method to be executed by a computer system for providing information about a wireless power transfer system including a power receiver mounted on a moving object and one or more power transmitters installed in one or more charging stations, the information providing method comprising:
- a search step of extracting location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and
- an output step of outputting the location information of the charging station extracted in the search step, wherein the usage history further indicates an actual value of power feeding performance of each of the power transmitters, and wherein the search step including a step of extracting the location information of the charging station having the power transmitter in which the actual value of the power feeding performance satisfies a reference value.

8. A non-transitory recording medium storing an information providing program for causing a computer to function as an information providing system for providing information about a wireless power transfer system including a power receiver mounted on a moving object and one or more power transmitters installed in one or more charging stations, the computer functioning as:

a search unit configured to extract location information of a charging station in which a power transmitter capable of feeding power to the power receiver is installed, by referring to a station storage unit that stores station information indicating correspondence between the location information of the charging station and the power transmitter of the charging station and to a history storage unit that stores a usage history indicating one or more power transmitters previously used by the power receiver; and an output unit configured to output the location information of the charging station extracted by the search unit, wherein the usage history further indicates an actual value of power feeding performance of each of the power transmitters, and wherein the search unit extracts the location information of the charging station having the power transmitter in which the actual value of the power feeding performance satisfies a reference value.

9. The information providing system according to claim 1, wherein the actual value of power feeding performance includes at least one of a power efficiency, an average amount of charge, an allowable amount of positional shift and an error probability, the power efficiency indicating a ratio of power in the power receiver to power in the power transmitter, the average amount of charge indicating an average value of an amount of charge in one power feeding operation, the allowable amount of positional shift indicating an amount of positional shift between the power transmitter and the power receiver when the power feeding succeeded, and the error probability indicating a ratio of a number of power feeding failures.

10. The information providing system according to claim 9, wherein the actual value of power feeding performance includes at least the power efficiency, and wherein the search unit extracts the location information of the charging station having the power transmitter for which the power efficiency is greater than or equal to a first threshold value.

11. The information providing system according to claim 9, wherein the actual value of power feeding performance includes at least the average amount of charge, and wherein the search unit extracts the location information of the charging station having the power transmitter for which the average amount of charge is greater than or equal to a second threshold value.

12. The information providing system according to claim 9, wherein the actual value of power feeding performance includes at least the allowable amount of positional shift, and wherein the search unit extracts the location information of the charging station having the power transmitter for which the allowable amount of positional shift is greater than or equal to a third threshold value.

13. The information providing system according to claim 9, wherein the actual value of power feeding performance includes at least the error probability, and wherein the search unit extracts the location information of the charging station having the power transmitter for which the error probability is less than a fourth threshold value.

* * * * *